United States Patent [19]

Jones, Jr.

[11] Patent Number: 4,933,083
[45] Date of Patent: Jun. 12, 1990

[54] POLYBENZIMIDAZOLE THIN FILM COMPOSITE MEMBRANES

[75] Inventor: R. Sidney Jones, Jr., Randolph, N.J.

[73] Assignee: Hoechst Celanese Corp., Somerville, N.J.

[21] Appl. No.: 723,128

[22] Filed: Apr. 15, 1985

[51] Int. Cl.⁵ .............................................. B01D 71/06
[52] U.S. Cl. .............................. 210/490; 210/500.39; 264/41
[58] Field of Search ................. 55/16, 158; 210/500.2, 210/490, 491, 500.39; 264/41

[56] References Cited

U.S. PATENT DOCUMENTS

| | | | |
|---|---|---|---|
| 3,720,607 | 3/1973 | Brinegar | 210/500.2 X |
| 3,883,626 | 5/1975 | Kamide et al. | 210/500.2 X |
| 3,951,920 | 4/1976 | Senoo et al. | 210/500.2 X |
| 4,230,463 | 10/1980 | Henis et al. | 55/16 |

*Primary Examiner*—Frank Spear
*Attorney, Agent, or Firm*—Burns, Doane, Swecker & Mathis

[57] ABSTRACT

A composite permselective membrane comprises an ultrathin semipermeable layer comprising a polybenzimidazole polymer in occluding contact with at least one surface of a microporous polymer support layer. Such membranes provide better combinations of flux and rejection rates in reverse osmosis processes than do conventional semipermeable membranes of polybenzimidazole polymer alone. In an embodiment, a composite permselective membrane is prepared by casting an ultrathin semipermeable layer of the polybenzimidazole polymer on a microporous polymer support layer. The semipermeable layer is preferably subjected to a drying step to evaporate part of the polybenzimidazole polymer solvent, then contacted with a coagulating bath. In some cases, the properties of the composite permselective membrane can be improved by annealing by contacting with an annealing liquid at an elevated temperature, the annealing liquid being selected from the group consisting of aqueous and nonaqueous solutions of liquid organic compounds which are solvents or non-solvents for the polybenzimidazole, and neat liquid organic compounds which are nonsolvents for said polybenzimidazole polymer.

35 Claims, No Drawings

POLYBENZIMIDAZOLE THIN FILM COMPOSITE MEMBRANES

BACKGROUND OF THE INVENTION

Semipermeable membranes prepared from various polymers can be utilized to separate components of solutions by various techniques such as reverse osmosis, electrodialysis or ultrafiltration. For instance, U.S. Pat. Nos. 3,679,538 and 3,801,404. disclose open celled microporous films of crystalline polymers such as polypropylene, and methods for their preparation. U.S. Pat. No. 4,240,914 discloses selective permeable anisotropic membranes of polyimide polymers having a dense skin layer on one surface of a porous layer.

Semipermeable membranes of polybenzimidazole polymers have been found useful for reverse osmosis processes. For example, U.S. Pat. No. 3,720,607 discloses semipermeable polybenzimidazole membranes having a thin layer of higher density on one surface. U.S. Pat. Nos. 3,737,042; 3,841,492; and 3,851,025 disclose similar membranes, in forms including flat films and hollow fibers, which have been annealed to improve separation properties of the thin surface portions of the membranes which perform the separation function. Unfortunately, the annealing treatments which improve the dense semipermeable layers do not always improve the porous layers which serve a support function. For example, U.S. Pat. No. 4,448,687 discloses mechanical problems resulting from annealing of polybenzimidazole polymer membranes. Most of these membranes must be kept moist during processing and storage.

Various composite membranes have been disclosed in the art. For example, U.S. Pat. No. 4,337,154 discloses composite semipermeable membranes comprising a porous support and a cross-linked thin film formed thereon. U.S. Pat. No. 4,230,463 discloses multicomponent membranes for gas separations which comprise a coating in contact with a porous separation membrane, in which the membrane's separation properties are largely determined by the porous separation membrane as opposed to the coating. Organic polymers which can be used for both the porous and coating portions include polysulfones and polyolefins, e.g., polypropylene. Polymers of polybenzimidazoles are not mentioned.

U.S. Pat. No. 4,378,400 discloses gas separating materials comprising a dense film of an aromatic imide polymer, optionally laminated on a porous substrate. U.S. Pat. No. 3,951,81 discloses composite semipermeable membranes comprising ultrathin cross-linked polyamide films formed either separately or in situ on porous substrates of polymers such as polysulfones. U.S. Pat. No. 4,260,652 discloses the preparation of permselective composite membranes by coating a microporous substrate with an aqueous amine solution of an imidazolone ring-containing aromatic polymer. The microporous substrate can be any known in the art, including polysulfones. Although Column 7 of U.S. Pat. No. 4,260,652 states that certain groups within the substituents listed for the imidazolone ring-containing aromatic polymer can be residues of benzimidazole-forming reagents, polybenzimidazoles are not mentioned in any of the above U.S. Pat. Nos. 4,378,400; 3,951,815; and 4,260,652.

For most separation processes using semipermeable membranes, two key parameters are the rejection value and flux. The rejection value is the relative ability of the membrane to retard the passage of the component or components being separated from the solution, e.g., a solute, usually expressed as a weight percentage of the total solute. Components rejected by semipermeable membranes include ionic materials such as NaCl and CaSO$_4$ and organic materials such as sucrose or ethanol. Thus, the rejection value can also be described as a solute rejection rate. Flux refers to the amount of solvent passing through the membrane per unit area per unit time, generally expressed in gallons/square foot/day.

For the purposes of this application, a permselective membrane is one which is overall selectively permeable to at least the solvent in a solution, rejecting at least a portion of the solute contained therein.

Although semipermeable membranes and processes for their preparation are now developed to a high degree, improved processes to produce low cost membranes having relatively high flux and rejection values are desired. Permselective membranes for liquid reverse osmosis processes providing high flux and rejection values at low cost are particularly desired.

An object of this invention is to provide improved composite permselective membranes useful for liquid separations such as reverse osmosis, having improved properties of at least one of rejection value and flux as compared to conventional semipermeable membranes of polybenzimidazole polymers.

Another object of the invention is to provide processes for preparing such improved membranes. In another aspect, an object of the invention is to provide composite membranes offering performance characteristics comparable to those of semipermeable polybenzimidazole membranes, but at lower total cost.

A further object of the invention is composite permselective membranes which can be dried without becoming brittle.

Yet another object of the invention is composite permselective membranes which achieve high hydrolytic stability by incorporating a support membrane which is relatively insensitive to base or acid catalyzed hydrolysis.

These and other objects, as well as the scope, nature and utilization of the claimed invention will be apparent to those skilled in the art from the following detailed description, examples and the appended claims.

SUMMARY OF THE INVENTION

In accordance with the present invention, there are provided composite permselective membranes which comprise a microporous polymer support layer and an ultrathin semipermeable layer comprising a polybenzimidazole polymer in occluding contact with at least one surface of the microporous polymer support layer. The microporous polymer support layer can be prepared from any suitable polymer, as described hereinafter.

Further in accordance with the present invention, a process is provided for the production of a composite permselective membrane as above, which comprises the following steps:
(a) providing a microporous polymer support layer having the configuration of a flat film or a hollow filament;
(b) casting or depositing a thin film of a polybenzimidazole polymer solution of less than about 3 mils thickness onto the microporous polymer support layer;

(c) coagulating the cast layer of polybenzimidazole polymer solution by contacting it with a coagulating liquid which is a nonsolvent for both the polybenzimidazole polymer and the microporous polymer support layer, and which is miscible with the solvent of the polybenzimidazole polymer solution.

DESCRIPTION OF THE PREFERRED EMBODIMENTS

It has been unexpectedly and surprisingly found that the production of composite membranes comprising a microporous polymer layer and an ultrathin semipermeable layer in occluding contact therewith, preferably cast thereon from a solution of a polybenzimidazole polymer, provides superior physical characteristics and performance (i.e., at least one of flux and rejection value) at lower cost than for comparable anisotropic membranes prepared of polybenzimidazole polymers alone. The composite membranes and their preparation are described in detail below.

I. The Microporous Polymer Support Layer

The microporous polymer support layers of the inventive composite membranes can be produced of any suitable polymer which can be prepared in thin films with the desired porosity and is compatible with conditions to which the composite membranes are to be exposed. The term "porous" signifies that the film has continuous channels for fluid flow, i.e., "pores" which communicate directly or indirectly between one surface and the other. The polymer films can be made porous in the process of production by various mechanical and/or physico-chemical means. A convenient process for forming microporous membranes is by controlled coagulation of a polymer solution to form an open porous structure rather than a continuous film. This is achieved by rapid contact with a coagulation liquid which is a non-solvent for the polymer. Cold drawing processes can also be used to form pores in a partially crystalline continuous film. Since a layer of polybenzimidazole polymer will generally be cast onto the microporous polymer support layer using a solvent, the polymer used in the support layer should be insoluble in the solvents which are to be used in making the polybenzimidazole polymer solution as well as compatible with polybenzimidazoles. The support layer should be dimensionally stable, smooth, and of relatively uniform thickness. The support layer can have any suitable thickness, preferably in the range from about 0.5 to about 12 mils, and more preferably from about 1 to about 5 mils.

The polymers selected for the microporous support layer can be either hydrophobic or hydrophillic, but should have surface characteristics which permit the polybenzimidazole polymer solution to at least partially penetrate surface pores of the polymer so that the resulting semipermeable layer adheres in occluding or intimate contact with the polymer support layer. Hydrophilic polymers are generally preferred for the support layer to facilitate wetting or intimate contact of the support layer by the semipermeable polymer layer. Normally hydrophobic polymers can be treated with surfactants or the like to make them sufficiently hydrophilic for this purpose.

By "occluding contact" it is meant that the semipermeable layer of polybenzimidazole polymer covers or permeates the surface pores of the porous support layer. Generally, this is achieved when the polybenzimidazole polymer solution is allowed to flow onto the surface of the porous polymer support, infiltrating or penetrating the surface pores so that after final processing, within close proximity to the surface these pores are at least partially filled with the polybenzimidazole polymer which serves the separation function.

Typical polymers suitable for the porous support layer used in the composite membranes of the invention can be substituted or unsubstituted polymers selected from polysulfones; polyether sulfones; polystyrenes, including styrene-containing copolymers such as acrylonitrile styrene copolymers, and styrenevinyl benzylhalide copolymers; polycarbonates; cellulosic polymers, such as cellulose acetate-butyrate, cellulose propionate, cellulose nitrate, and alkyl celluloses such as ethyl cellulose; polyamides and polyimides, including alkyl polyamides and aryl polyimides; polyethers; poly(arylene oxides) such as poly(phenylene oxide) and poly(xylene oxide); poly(esteramidediisocyanates); polyurethanes; polyesters (including polyarylates), such as poly(ethylene terephthalate), poly(phenylene terephthalate), etc.; oxymethylene homopolymers and copolymers; polyacrylates such as poly(alkyl methacrylates) and polyalkylacrylates; polysulfides, including both polyalkylene and polyarylene sulfides; polyolefins, including both homopolymers and copolymers of olefins; vinyl polymers such as poly(vinyl chloride), poly(vinyl esters), poly(vinyl alcohols), poly(vinyl ethers), poly(vinyl ketones), poly(vinyl aldehydes), poly(vinyl amides), and poly(vinyl amines); polyhydrazides; polyoxadiazoles; polytriazoles; and copolymers, including block copolymers containing repeating units from the above, and grafts and blends containing any of the foregoing. Typical substituents providing substituted polymers include halogens such as fluorine, chlorine and bromine; hydroxyl groups; lower alkyl groups; lower alkoxy groups; monocyclic aryl groups; lower acyl groups and the like.

Selection of the polymer(s) for the microporous support layer of the inventive composite permselective membranes can be made on the basis of the heat resistance, solvent resistance, surface properties and mechanical strength of the support layers as prepared, as long as the resulting composite membrane provides the requisite flux and rejection rate for the separation processes to be carried out in accordance with the invention. The porous polymer support layer is preferably at least partially self-supporting, and most preferably is sufficiently self-supporting to provide essentially all the structural support for the composite membrane; however, the composite membrane can also include structural support members or materials which provide little, if any, resistance to the passage of fluids.

In an embodiment, microporous polymer support materials which are presently preferred are selected from the group consisting of polysulfones, polyethersulfones, polyolefins and mixtures thereof.

Among the polysulfones which may be utilized are those having a polymeric backbone having the repeating structural unit:

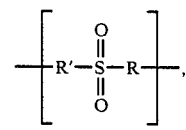

where R and R' can be the same or different and are aliphatic or aromatic hydrocarbyl-containing moieties (i.e., aromatic hydrocarbon-based substituents) of 1 to about 40 carbon atoms, wherein the sulfur in the sulfonyl group is bonded to aliphatic or aromatic carbon atoms, and the polysulfone has an average molecular weight suitable for film or fiber formation, often at least about 8000 or 10,000. When the polysulfone is not cross-linked, the molecular weight of the polysulfone is generally less than about 500,000, and is frequently less than about 100,000. The repeating units may be bonded, i.e. R and R' may be bonded, by carbon to carbon bonds or through various linking groups such as

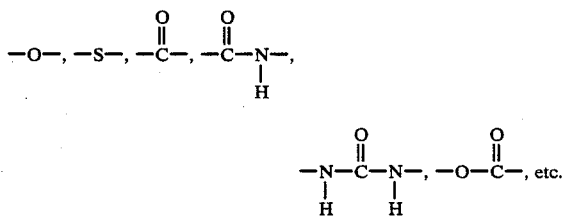

Particularly advantageous polysulfones are those in which at least one of R and R' comprises an aromatic hydrocarbyl-containing moiety (i.e., an aromatic hydrocarbon-based substituent) and the sulfonyl moiety is bonded to at least one aromatic carbon atom. An example is the polysulfone produced by the copolymerization of 4,4'-dichlorophenylsulfone and bisphenol A, with recurring units having the formula

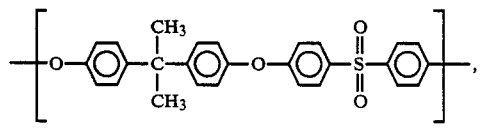

which is commercially available under the trademark Udel from Union Carbide Corporation, as described in U.S. Pat. No. 4,460,736. Many suitable polysulfones can be selected by those skilled in the art from those disclosed in U.S. Pat. No. 4,230,463, which is incorporated by reference herein.

Suitable polyether sulfones can be selected from those having a polymeric backbone having the repeating structural unit:

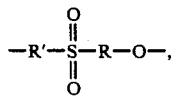

where R and R' can be the same or different, and groups as recited above for polysulfones, including linking groups as appropriate. A preferred polyether sulfone is produced by the polymerization of 4-(4-chlorophenylsulfonyl)phenol, and contains recurring units having the formula:

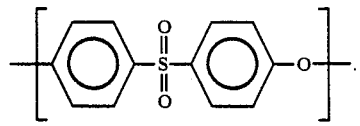

This polyether sulfone is disclosed in U.S. Pat. No. 4,460,736, and is commercially available from Imperial Chemical Industries, Ltd.

One presently preferred material is polypropylene, including both the homopolymer and copolymers, since it is readily available and has produced good results. Microporous polymer films of these materials are available commercially, e.g., Celgard® polypropylene, produced by the Celanese Corporation, and microporous polysulfone films, available from several suppliers. The Celgard® films have pores of relatively oblong shape and low tortuosity, while the polysulfone films generally have pores of high tortuosity. Preferred microporous polymer films and processes for their production are disclosed in U.S. Pat. Nos. 3,679,538 and 3,801,404, which are incorporated by reference herein. These microporous films are prepared by consecutive steps of cold stretching, hot stretching and heat setting a non-porous, crystalline, elastic polymer film.

Since many such microporous films produced from hydrophobic polymers such as polypropylene are hydrophobic, it is preferred that they be treated or coated to render them hydrophilic before using them as support films for the composite membranes of the present invention. Hydrophilic microporous films comprising a hydrophobic microporous film, having a lower bulk density than the non-porous precursor film from which it is prepared, and a coating of at least one surfactant, e.g., a silicon glycol copolymer which renders the coated microporous film hydrophilic, and methods for the preparation thereof, are disclosed in U.S. Pat. No. 3,929,509, which is incorporated by reference herein.

The microporous polymer support layer should contain pores having average dimensions in the range of from about 50 to about 4000 A, more preferably from about 100 to about 2000 A, and generally has a thickness in the range of from about 0.5 to about 12 mils, preferably from about 1 to about 5 mils. The polymeric support layer should also exhibit excellent uniformity of pore size, particularly the absence of large pores and flaws which would result in a rough or broken surface.

Since the microporous polymer support layer is not expected to be selective to the solute in the solutions to be separated, it need not provide a significant rejection value for such solutes, and should have a flux value at least as high as is to be obtained with the ultrathin semipermeable membrane layer in place. The flux value required will vary with the applications to which the composite membranes are put, but generally for reverse osmosis processes, for example, the microporous polymer support layer alone should have a flux for distilled water of at least about 200 gallons/square ft./day at 250 psi pressure.

The microporous polymer support layers upon which the ultrathin semipermeable membranes are to be cast can be produced in any suitable form, typically flat films, tubes, hollow filaments or groups of hollow filaments mutually attached. Flat films or hollow filaments are presently preferred. Where appropriate for extra strength or support, the microporous polymer support layers can be formed upon additional porous support materials comprising porous metal plates, foils or films, perforated sheets or films of polymers, or supports such as fabrics, both woven and nonwoven, comprising fibers of materials selected from the group consisting of metals, inorganic compounds, minerals and both natural and synthetic polymers, as well as mixtures of the foregoing. Such support layers preferably contribute strength without impeding the flow of liquids through the composite membrane significantly.

II. The Polybenzimidazole Polymers

The polymeric material utilized to form the semipermeable membranes to which the present invention applies is a linear polybenzimidazole. Typical polymers of this class and their preparation are more fully described in U.S. Pat. Nos. 3,737,042; 2,895,948 and RE 26,065, which are herein incorporated by reference. The polybenzimidazoles comprise recurring units selected from the group consisting of units of the following Formulas (I) and (II), and preferably consist essentially of such recurring units. Formula (I) is:

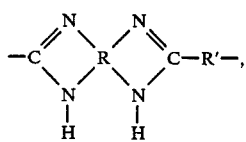

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran.

Formula (II) is:

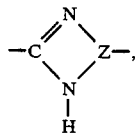

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of recurring units selected from the group consisting of units of Formulas (I) and (II) wherein R' is an aromatic ring or a heterocyclic ring.

As set forth in U.S. Pat. RE No. 26,065, the aromatic polybenzimidazoles having recurring units of Formula (II) may be prepared by self-condensing a trifunctional aromatic compound containing only a single set of ortho-disposed diamino substituents and an aromatic, preferably phenyl, carboxylate ester substituent. Exemplary of polymers of this type is poly-2,5(6)-benzimidazole, prepared by the autocondensation of phenyl-3,4-diaminobenzoate.

As also set forth in U.S. Pat. RE No. 26,065, the aromatic polybenzimidazoles having recurring units of Formula (I) may be prepared by condensing an aromatic tetraamine compound containing a pair of orthodiamino substituents on the aromatic nucleus with a dicarboxyl compound selected from the group consisting of (a) the diphenyl ester of an aromatic dicarboxylic acid, (b) the diphenyl ester of a heterocyclic dicarboxylic acid wherein the carboxyl groups are substituents upon carbon in a ring compound selected from the group consisting of pyridine, pyrazine, furan, quinoline, thiophene and pyran, and (c) an anhydride of an aromatic dicarboxylic acid.

Examples of polybenzimidazoles which have the recurring structure of Formula (I) are as follows:
poly-2,2'-(m-phenylene-5,5'-bibenzimidazole);
poly-2,2'-(pyridylene-3",5")5-5'-bibenzimidazole;
poly-2,2'-furylene-2",5")-5'-bibenzimidazole;
poly-2,2'-(naphthalene-1",6")-5,5'-bibenzimidazole;
poly-2,2'-amylene-5,5'-bibenzimidazole;
poly-2,2'-octamethylene-5,5'-bibenzimidazole;
poly-2,6-(m-phenylene)-dimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,Z'-(m-penylene)-5,5'-di(benzimidazole) methane:
poly-2',2"-(m-phenylene)-5',5"-di(benzimidazole) propane-2,2': and
poly-2',2"-(m-phenylene)-5',5"-di(benzimidazole) ethylene-1,
where the double bonds of the ethylene 9roups are intact in the final polymer.

A preferred polybenzimidazole for us in the present process is one prepared from poly-2,2'-(m-phenylene-5,5'bibenzimidazole), the recurring unit of which is:

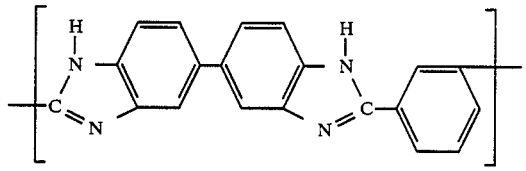

Any polymerization process known to those skilled in the art may be employed to prepare the polybenzimidazole which is utilized to form semipermeable layers for composite membranes in accordance with the present invention. With respect to aromatic polybenzimidazoles, preferably, equimolar quantities of the monomeric tetraamine and dicarboxyl compound may be introduced into a first step melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity (I.V.), expressed as deciliters per gram, of at least 0.1, and preferably from about 0.13 to about 0.3 (determined from a solution of 0.4 grams of the polymer in 100 ml. of 97 percent $H_2SO_4$ at 25° C.).

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4 deciliters/gram (e.g., 0.7 to 1.4 or more).

The temperature employed in the second stage is at least 250° C., preferably at least 325° C., and more preferably from about 350° to 425° C. The second stage reaction generally takes at least 0.5 hours, and preferably from about 1 to 4 hours or more. It is of course also possible to prepare the instant polymers via a one-step reaction, which is equally satisfactory, provided polymer of comparable molecular weights, etc. is obtained.

III. The Polymer Solution

The solvents utilized to form the polybenzimidazole polymer solutions used in preparing the semipermeable layer for the composite membranes of the instant invention include those solvents which are commonly recognized a being capable of dissolving the particular polybenzimidazole polymer. For instance, the solvents may be selected from those commonly utilized in the formation of polybenzimidazole dry spinning solutions. Illustrative examples of suitable organic solvents include N,N-dimethylacetamide, N,N-dimethylformamide, dimethylsulfoxide, tetramethylene sulfone, hexamethylphosphoramide, and N-methyl-2-pyrrolidone. A particularly preferred solvent is N,N-dimethylacetamide. Additional representative solvents include formic acid, acetic acid, polyphosphoric acid, and sulfuric acid. The solvent is selected to avoid any detrimental effect on the microporous support membrane during the coating of the polybenzimidazole polymer layer.

The polymer solutions may be prepared, for example, by dissolving sufficient polybenzimidazole in the solvent to yield a final solution containing from about 5 to 30 percent by weight of polymer based on the total weight of the solution, preferably from about 8 to about 25 percent by weight.

The quantity of polybenzimidazole dissolved in the solvent should generally be such that the resulting solution has a Brookfield viscosity of about 500 to about 100,000 centipoises at 30° C., and preferably about 1,500 to about 50,000 centipoises.

One suitable means for dissolving the polymer in the solvent is by mixing the materials at a temperature above the normal boiling point of the solvent, for example, about 25° C. to 120° C. above such boiling point, and at a pressure of 2 to 15 atmospheres for a period of 1 to 5 hours. The resulting solutions then preferably are filtered to remove any undissolved polymer.

A minor amount of an additive such as lithium chloride optionally may be provided in the polymer solution in accordance with the teachings of U.S. Pat. No. 3,502,606 and U.S. Pat. No. 4,321,182. In addition to lithium chloride, which is presently preferred, suitable additives include zinc chloride, N-methyl morpholine, triethylamine and triethanolamine. Also suitable are organolithium compounds selected from the group consisting of $RCO_2Li$, $RSO_3Li$, $ROSO_3Li$, and mixtures thereof, wherein R is a hydrocarbon radical having from 1 to about 50 carbon atoms. Representative lithium salts are lithium formates, lithium acetate, lithium propionate, lithium butyrate, lithium isobutyrate, lithium valerate, lithium cetylate, lithium stearate, etc. Representative lithium hydrocarbon sulfonates are lithium lauryl sulfonate, lithium cetyl sulfonate, etc. Representative lithium hydrocarbon sulfates are lithium lauryl sulfate, lithium cetyl sulfate, etc. The preferred organolithium compound is lithium stearate. The additive serves the function of preventing the polybenzimidazole polymer from separating out of the solution upon standing for extended periods of time, and helps to maintain a suitable viscosity, as discussed below.

IV. Casting Semipermeable Polymer Layers Onto the Porous Polymer Support Layer

To form the composite membranes of this invention, the solution of polybenzimidazole polymer is preferably deposited or cast onto the porous polymer support layer to form a wet film of the polybenzimidazole polymer. The procedures are much the same as in depositing a film of polybenzimidazole polymer upon a conventional support as known in the prior art, e.g., U.S. Pat. No. 4,448,687, except that the thickness of the film is carefully controlled to provide an ultrathin semipermeable film or coating of polybenzimidazole polymer upon the porous support layer Numerous techniques are available for the application of the solution to the porous support layer, as will be apparent to those skilled in the art. For instance, the polybenzimidazole polymer solution may simply be poured upon the level support layer in a quantity sufficient for it to assume the desired uniform thickness. A blade optionally may be drawn over the surface of the wet film to aid the deposition of a wet film of uniform desired thickness. In a preferred embodiment of the invention, the solution is deposited by the utilization of a doctor blade caster.

The thickness of the wet film deposited upon the support is influenced by the desired thickness of the polybenzimidazole semipermeable film ultimately to be deposited upon the porous polymer support layer. Generally, the wet film is deposited upon the support layer in a substantially uniform thickness of less than about 3 mils. In a preferred embodiment of the invention, the wet film is deposited in a thickness of less than about 2 mils, and in particularly preferred embodiments, the wet film is deposited in thicknesses in the range of from about 0.2 to about 2 mils. The wet film is preferably cast using a precision doctor blade. The casting thickness is influenced by the polymer inherent viscosity and the polymer concentration in the casting solution. Generally, polymer inherent viscosities of at least about 0.6 deciliters/gram and polymer concentrations of about 15 weight percent are preferred.

Preferably, a quantity of solvent is next evaporated from the exposed surface of the wet film to allow the formation of at least a relatively thin solid layer, (i.e., a thin porous polymeric film) on the exposed surface of the polybenzimidazole polymer solution. The thin solid film commonly exhibits a thickness of at least about 0.01 to about 20 μm and preferably from about 5 to about 15 μm thickness. During the formation of the solid layer on the exposed surface of the film, the solvent present near the Surface of the wet film evaporates and a thin coagulated solid layer or skin of polybenzimidazole polymer remains. The remaining portion of wet polybenzimidazole film which supports the solid layer can remain essentially unchanged while said solid layer is formed. The solid layer thus exhibits a density which is substantially greater than that of the remaining portion of the polybenzimidazole film, which has not undergone coagulation and continues to possess a liquid consistency.

The evaporation of solvent from the exposed surface of the wet film may be accomplished by a variety of techniques, as will be apparent to those skilled in the art. For instance, a stream of air or other gas at ambient temperature or an elevated temperature (e.g., approaching the boiling p int of the solvent) may be simply directed at the exposed surface of the wet film. Alternatively, the wet film may be simply allowed to stand in an uncirculated gaseous environment wherein the requisite degree of solvent evaporation is accomplished. In a further embodiment of the invention, the gaseous atmosphere to which the wet film is exposed may be at reduced pressure, e.g., from 100 mm of Hg up to about atmospheric pressure. It will be apparent to those skilled in the art that the rate at which the solvent is evaporated increases with the temperature of the gaseous atmosphere impinging upon the wet film, the flow rate of the gaseous atmosphere and with reduced pressure. The time required to form the desired thin solid layer upon the exposed surface of the wet film commonly ranges from about 5 seconds to about 30 minutes, and preferably from about 15 seconds to about 5 minutes. In a preferred embodiment of the invention the wet film is exposed to a stream of circulating air at ambient temperature (e.g., 25° C.) and pressure for about 1 to about 5 minutes. When the air is not circulated, longer exposure times can be advantageously employed.

The resulting film, bearing a thin solid layer upon its surface and intimately attached to the porous polymer support layer in occluding contact therewith, is next converted to a semipermeable or permselective composite membrane suitable for separating components of a solution by contacting the same with a nonsolvent for the polybenzimidazole polymer which is capable of removing residual quantities of the polybenzimidazole solvent, thus coagulating the polybenzimidazole polymer. The contacting or coagulating liquid should also be a nonsolvent for the polymer in the porous polymer support layer. Various liquids meeting these requirements can be selected by those skilled in the art. During the coagulation step, the remaining polybenzimidazole polymer within the wet film is coagulated, while the solvent which originally dissolved the same is at least partially removed. The coagulating medium is preferably aqueous in nature, and is most preferably water or aqueous alcohol. Various aqueous media can be used, comprising mixtures of water with organic liquids such as N,N-dimethylacetamide, aliphatic alcohols such as methanol and ethanol, and the like. In an embodiment, a mixture of water and ethanol is presently preferred, as the rejection properties of such membranes are surprisingly found to be improved by annealing, without the usual decrease in flux.

Organic liquids which are solvents for polybenzimidazoles (e.g., N,N-dimethylacetamide) can form a portion of the coagulating liquid, provided that the liquid as compounded is a non-solvent for these polymers. In addition to aqueous solutions, the coagulating liquid can consist of an organic liquid neat or in admixture with at least one other organic liquid.

The coagulating or wash step is preferably carried out by immersing the film in the wash medium. Alternatively, any other convenient means for contacting the film with the wash medium may be utilized, such as by spraying the film with the same. In a preferred embodiment of the invention, a water wash medium is provided at a relatively cool temperature, e.g., at about 5° to about 30° C. and at a temperature of about 10° to 25° C. in a particularly preferred embodiment. The time required to accomplish coagulation of the remaining polybenzimidazole polymer and the substantially complete removal of the residual solvent for the same varies with the temperature of the wash medium. Satisfactory wash times commonly range from about 30 seconds to about 20 minutes, and preferably from about 2 to about 5 minutes. Considerably longer washing times may be employed, but generally with n commensurate advantage.

The resulting ultrathin semipermeable membrane layer formed of polybenzimidazole polymer upon the porous polymer support layer consists of an outer relatively thin surface layer formed during the evaporation step adjacent to relatively thick layer of more porous structure formed during the wash step, the entire layer being intimately attached to the porous support layer. It is believed that the denser relatively thin outer layer of the polybenzimidazole membrane layer is primarily responsible for the ability described hereafter of the resulting composite membranes to effect the separation of the components of a solution, and that the remaining more porous portion of the ultrathin polybenzimizadole layer provides primarily a supporting function for this portion. However, compared to the anisotropic polybenzimidazole semipermeable membranes known in the art, the dense outer layer constitutes a relatively greater proportion of the polybenzimidazole layer in the semipermeable layers deposited upon the microporous support layer of the composite membranes of this invention.

While the deposition of the polybenzimidazole layer upon the microporous polymer support layer has been described for embodiments wherein said microporous polymer support layer takes the form of a flat film, similar ultrathin polybenzimidazole membrane layers can be deposited upon porous polymer support layers in other forms including tubes and hollow filaments, by techniques known to those skilled in the art. Composite hollow filaments as disclosed in U.S. Pat. No. 3,494,121, can be used. To produce the desired ultrathin films of polybenzimidazole polymer upon such substrates as tubular or hollow filaments of the microporous polymer support material, techniques such as meniscus coating can be employed. In meniscus coating, the support layer is drawn through a solution of the polybenzimidazole polymer. The wet coating forms at the liquid-gas (i.e., air) interface. The thickness of the coating obtained is a function of several parameters, including solution viscosity, the speed of withdrawing the microporous support layer, and the rate of coagulation of the wet polymer coating.

An important factor in the preparation of the composite membranes of this invention is insuring that the polybenzimidazole polymer film is cast in a suitably ultrathin layer. Doctor blades and various other techniques known to those skilled in the art can be utilized to produce coagulated films of less than about 1 mil in thickness, and preferably less than about ½ mil in thickness. The finished polybenzimidazole polymer film preferably has an average thickness in the range of from about 0.01 to about 0.4 mil, and most preferably from about 0.02 to about 0.2 mil. Unexpectedly, it has been found that in producing such a composite membrane, the thinner the ultrathin film of polybenzimidazole polymer, the stronger and more flexible that portion of the membrane is. Surprisingly, these thinner films provide superior rejection and flux values compared to films which are slightly thicker, e.g., films of less than about 1 mil thickness compared to membranes of thickness in the range of about 4 to about 10 mils as previously known.

An important factor in preparing cast polybenzimidazole films of the requisite thickness is the viscosity of the polybenzimidazole polymer solution used. The viscosity of this polymer solution can be controlled by varying the molecular weight and concentration of the polybenzimidazole polymer in the solution and, when an additive such as lithium chloride is added, varying the molar ratio of said additive to the polymer in solution. By using such an additive at a relatively high molar ratio of additive to polybenzimidazole polymer, the desired viscosity for applying the polymer solution to the support can be obtained at a lower concentration of the polybenzimidazole. Thus, a thinner final film of polybenzimidazole is obtained, which is stronger and offers high flux and rejection values.

For casting the desired thin films, the polybenzimidazole polymer solution should generally have a Brookfield viscosity in the range of from about 500 to about 100,000 centipoises, preferably from 1500 to about 50,000, and most preferably from 2000 to about 10,000 centipoises, when measured at 30° C. The molar ratio of lithium chloride (or other such additive) to benzimidazole moiety can be in the range of from about 0.01:1 to about 3:1, preferably from about 0.1 to about 2:1, and most preferably from about 0.15:1 to about 1.5:1, with the higher ratios being suitable for use with polymers of lower molecular weight. Polybenzimidazole polymers of any suitable molecular weight can be used, preferably those which produce an inherent viscosity of at least about 0.6, and preferably in the range from about 0.6 to about 1 deciliters/gram, as determined from a solution of 0.4 grams of the polymer in 100 ml of 97 percent $H_2SO_4$ at 25° C. The polymer solution can have a concentration in the range of from about 5 to about 30, preferably from about 8 to about 25, and most preferably from about 12 t about 18 weight percent.

V. Annealing the Composite Membranes

As with the anisotropic polybenzimidazole membranes of the prior art, the composite membranes of the istant invention can generally be improved significantly by annealing. Annealing is preferably conducted at an elevated temperature for a time effective to improve at least one of the rejection and flux values. Annealing is carried out by contacting the complete composite membrane with an annealing liquid, preferably by immersion, although brushing, spraying and the like can also be used. A variety of annealing liquids and treatments are known in the art, and the choice of materials and procedures is not believed to be critical, although the selection can be varied to optimize results with particular composite membranes. However, the annealing liquid used should be nondeleterious to the composite membrane and its component layers, e.g. not dissolve or damage the polymers used therein, cause the layers to separate, or the like.

The annealing liquid can be an aqueous or non-aqueous solution of at least one liquid organic compound which is either a solvent or a non-solvent for the polybenzimidazole polymer, or at least one such non-solvent neat liquid. Various types of annealing liquids are suitable for the different types of polybenzimidazole polymers, and can be selected by those skilled in the art without excessive experimentation.

Exemplary non-solvent liquids include polyhydroxy aliphatic alcohols having two to three hydroxy groups and two to about six carbon atoms. Representative polyhydroxy aliphatic alcohols for use in the present invention include glycols such as ethylene glycol (1,2-ethanediol), propylene glycol (1,2-propanediol), trimethylene glycol (1,3-propanediol), alphabutylene glycol (1,2-butanediol), beta-butylene glycol (1,3-butanediol), tetramethylene glycol (1,4-butanediol), diethylene glycol (2,2'-oxydiethanol), triethylene glycol (2,2'-(ethylenedioxy) diethanol), and hexamethylene glycol (1,6-hexanediol). Other polyhydroxy aliphatic alcohols such as glycerol (1,2,3-propanetriol) may likewise be selected. The particularly preferred polyhydroxy aliphatic alcohols are ethylene glycol, glycerol, and 1,3-butylene glycol. Mono- and dialkyl ethers of ethylene glycol marketed under the trademark Cellosolve ® also be selected. Known plasticizers for the polymer are also suitable non-solvents for polybenzimidazole which can be used in the present invention.

Suitable solvents for the polybenzimidazole polymer which can be employed in the annealing liquid include but are not limited to those previously identified during the discussion regarding formation of the polybenzimidazole polymer layer. The annealing liquid comprises a minor portion of the solvent and a major portion of the nonsolvent in one embodiment, with the solvent preferably being present in an amount ranging from about 1 to 50 (preferably about 1 to 30) percent by weight and the non-solvent preferably being present in an amount ranging from about 99 to 50 (preferably about 99 to 70) percent by weight, based on the total weight of the annealing liquid.

If the composite membrane is annealed at a temperature in excess of 100° C., the membrane is preferably pretreated prior to the annealing step to remove residual water contained therein so that the water does not vaporize during annealing and undesirably affect the physical properties of the membrane. Such pretreatment is conventionally accomplished by contacting the membrane with a suitable medium such as ethylene glycol which can selectively replace the water. The membrane is generally passed through sequential baths of increasing concentration of ethylene glycol at room temperature (e.g., 25, 50, 75 and 100 percent by weight) for 5 to 10 minutes each until the water in the membrane is removed. The membrane is thereafter annealed as described in the annealing liquid. Subsequent to annealing, the membrane is passed back through the baths in reverse order to selectively replace the ethylene glycol with water.

It is preferred that the annealing liquid have a boiling point in excess of the temperature at which the annealing step is conducted so that this step may be conveniently carried out at atmospheric pressure. If necessary, however, the annealing step may be conducted under superatmospheric pressure conditions.

To minimize adverse physical effects on the composite membrane and avoid the necessity of pretreatment prior to annealing, an annealing liquid can be selected which permits effective annealing at a minimum temperature, preferably below the boiling point of water, e.g., 100° C. at atmospheric pressure. In an embodiment, a mixture of a non-aqueous non-solvent and a solvent for the polybenzimidazole polymer is presently preferred for this purpose.

Contact between the semipermeable composite membrane and the annealing liquid is preferably accomplished by immersing either the film or the fiber in a bath of the medium. When contact is carried out through immersion, the annealing liquid can be heated to the desired temperature prior to immersion, or the liquid can be raised to the desired temperature while in contact with the membrane. Such contact can alternatively be carried out by spraying or other similar techniques, as will be apparent to those skilled in the art. It is recommended that the composite membrane be annealed under conditions wherein it is free to shrink.

Shrinkages of about 5 to 10 percent in dimension are commonly observed during the annealing step with polybenzimidazole membranes alone. It is generally preferred that the composite membrane is removed from any support prior to the annealing step.

The period of time during which the annealing step is conducted varies with the temperature of the annealing liquid. Generally, satisfactory annealing is conducted during a period of time ranging from about 30 seconds to 20 minutes, preferably from about 1 minute to about 15 minutes, and most preferably ranging from about 5 to 10 minutes.

Generally, annealing can be conducted at temperatures ranging from the minimum at which any improvement in composite membrane properties is observed (i.e., about 60° C.) up to temperatures at which adverse physical effects to the membrane offset the benefits obtained by annealing (i.e., about 180° C.). Since lower annealing temperatures require more time, but temperatures above the boiling point of water may cause physical problems or require extra steps, a temperature should be chosen which produces optimum results for a given composite membrane composition and annealing liquid. Such temperatures will generally be in the range of from about 80° C. to about 140° C., preferably from 90° C. to about 120° C., and most preferably from about 90° C. to about 110° C. In an embodiment, a temperature in the range of about 95° C. to about 105° C. is preferred.

The theory whereby the properties of the semipermeable composite membranes are improved through the annealing treatment is considered complex and incapable of simple explanation. It is believed, however, that the microstructure of at least the polybenzimidazole layer of the membrane contracts to some degree to yield a more uniform configuration. Also, as indicated hereafter, the annealing step results in improved performance during desalination separations.

The following examples are given as specific illustrations of the invention. It should be understood however, that the invention is not limited to the specific details set forth in these examples.

EXAMPLE I

Films of polybenzimidazole polymer prepared from poly-2,2'-(m-phenylene)-5,5'- bibenzimidazole) having a inherent viscosity of about 0.6 deciliters/gram were cast on microporous support films of wettable Celgard ® Type 3401, a polypropylene microporous film treated with a cationic/nonionic surfactantcomposition, produced by Celanese Corporation and having average pore dimensions of about 200 Å by 2000 Å (i.e., longitudinal pores), an effective pore size of $8 \times 10^{-4}$ mil. and an average thickness of about 1 mil using dope solutions in N,N-dimethylacetamide at concentrations of 8.8, 10, 12.5 and 15 weight percent. A lithium chloride additive was used in concentrations providing a ratio of 2 moles or less lithium chloride per mole of benzimidazole moiety. The properties of the solutions are listed in Table I.

TABLE I

Casting of Composite Membranes

| Sample | PBI[1] Conc. Wt. % | LiCl/BI[2] Ratio | Viscosity Centipoises | Preliminary Solvent Evaporation (Min.) |
|---|---|---|---|---|
| 1 | 8.8 | 2.0 | 550 | 2.5 |
| 2 | 10 | 2.0 | 1,060 | 2.5 |
| 3 | 12.5 | 2.0 | 7,160 | 2.5 |
| 4 | 15 | 2.0 | >88,000 | 10 |
| 5 | 15 | 1.0 | 7,500 | 2.5 |
| 6 | 15 | 0.5 | 2,860 | 2.5 |
| 7 | 15 | 0.25 | 2,210 | 2.5 |
| 8 | 15 | 0.18 | 2,020 | 2.5 |

[1]Polybenzimidazole.
[2]Molar ratio of LiCl to benzimidazole moiety

The Celgard ® samples were stretched over flat glass plates, with parallel strips of "Scotch" ® tape laid down on either end of the film samples to maintain tension. A shimmed blade, providing 0.5 mil clearance, was used to cast the wet polybenzimidazole films. In other words, the doctor blade was modified by taping metal shims to both ends of the flat surface, so that a 0.5 mil shim produced a 0.5 mil casting clearance. The resulting composite membrane were placed in a circulating air oven at 40±2° C., then into a water bath for coagulation for about one hour at ambient temperature. The composite membranes were annealed in a water bath at 100° C. for 10 minutes.

The composite membranes prepared as described above were tested for reverse osmosis flux and rejection values before and after annealing, using a recirculating loop membrane test unit. Tests were run for 24 hours at 400 psi, using water containing 0.5 weight percent NaCl. Water temperature was 27°±1° C., pH was 6.0±0.1, and the flow rate in the loops was 18 gallons/hr.

Test results are presented in Table II below:

TABLE II

Reverse Osmosis Performance of Composite Membranes

| Sample | Polymer Conc. Wt. % | Solution Viscosity cps | LiCl/BI[1] ratio | As Cast | | Annealed | |
|---|---|---|---|---|---|---|---|
| | | | | Rejection % | Flux gfd[2] | Rejection % | Flux gfd[2] |
| 1 | 8.8 | 550 | 2.0 | 8.2 | 361 | 7.8 | 361 |
| 2 | 10.0 | 1,060 | 2.0 | 23.1 | 18.6 | — | — |
| 3 | 12.5 | 7,160 | 2.0 | 53.8 | 3.6 | 42.2 | 7.3 |
| 4 | 15.0 | >88,000 | 2.0 | 86.0 | 4.7 | 84.7 | 1.8 |
| 5 | 15.0 | 7,500 | 1.0 | 30.6 | 16.1 | 52.7 | 16.8 |
| 6 | 15.0 | 2,860 | 0.5 | 50.0 | 0.9 | 86.4 | 1.9 |
| 7 | 15.0 | 2,210 | 0.25 | 7.7 | 3.0 | 61.0 | 0.7 |
| 8 | 15.0 | 2,020 | 0.18 | 10.8 | 7.9 | 55.9 | 2.1 |

[1]Molar ratio of LiCl to benzimidazole moiety.
[2]Gallons/square foot/day.

Test results for samples 1–4 indicate that the rejection rate for the unannealed membranes increases with the solution polymer concentration and viscosity, with the flux generally decreasing as expected. Annealing of these samples did not affect the rejection rates appreciably. Samples 4–8, all using polymer concentration of 15 weight percent but varying molar ratios of LiCl/BI, indicate that higher LiCl/BI ratios (e.g., Sample 4 at 2.0) give higher viscosity solutions and higher rejection rates in the membranes as cast, but less difference is seen among the annealed membranes, since the rejection rates are already fairly high.

Additional composite membranes were prepared and tested as described above, using polymer solutions containing 15 weight percent polybenzimidazole and various LiCl/BI ratios. Coagulating baths of water or 30 weight percent aqueous ethanol were used. Test results for these membranes are shown in Table III.

TABLE III

Performance of Membranes Prepared in Various Coagulating Baths

| Sample | LiCl/BI Ratio[1] | Coagulation Bath | Solution Viscosity cps | As Cast Rejection % | As Cast Flux gfd | Annealed Rejection % | Annealed Flux gfd |
|---|---|---|---|---|---|---|---|
| 9 | 0.18 | $H_2O$ | 2020 | 10.8 | 3.9 | — | —* |
| 10 | 0.25 | $H_2O$ | 2210 | 7.7 | 141.5 | 23.7 | 2.3 |
| 11 | 0.50 | $H_2O$ | 2860 | 7.7 | 114.6 | 77.8 | 4.1 |
| 12 | 1.00 | $H_2O$ | 7500 | 7.7 | 23.4 | — | —* |
| 13 | 2.00 | $H_2O$ | 88000 | 86.0 | 4.7 | 84.7 | 1.8 |
| 14 | 0.18 | $H_2O$/EtOH[2] 70/30 | 2020 | 16.0 | 2.1 | 45.5 | 2.5 |
| 15 | 0.25 | $H_2O$/EtOH 70/30 | 2210 | 19.4 | 1.8 | 52.7 | 2.4 |
| 16 | 0.50 | $H_2O$/EtOH 70/30 | 2860 | 50.0 | 0.9 | 86.4 | 1.9 |
| 17 | 1.00 | $H_2O$/EtOH 70/30 | 7500 | 30.6 | 16.1 | 52.7 | 16.8 |

*membrane failed
[1]Molar ratio of LiCl to benzimidazole moiety.
[2]Aqueous ethanol, 30 weight percent.

In Table III, Samples 9-13 indicate that when a water coagulating bath is used, the best rejection rate in the unannealed membrane is obtained with a LiCl/BI molar ratio of 2.0, but this performance is not improved by annealing. In Samples 10 and 11, with lower LiCl/BI ratios, annealing significantly increased the rejection rate, while decreasing flux as expected. Samples 14–17, using a coagulating bath of aqueous ethanol, produced much higher "as cast" rejection rates than samples using only water in the coagulation bath, for corresponding LiCl/BI ratios. Furthermore, annealing increased these rejection rates in all cases. Also, in contrast to the decrease in flux normally obtained when annealing membranes coagulated in water, with these membranes the flux actually increased slightly. Very favorable results were produced by Sample 17, using a LiCl/BI ratio of 1.0 —a rejection rate of 52.7 percent and flux of 16.8 gfd for the annealed membrane.

Although the invention has been described with preferred embodiments, it is to be understood that variations and modifications may be employed without departing from the concept of the invention as defined in the following claims.

I claim:

1. A composite permselective membrane useful for liquid separations which comprises a microporous polymer support layer of at least one polymer selected from the group consisting of polyolefins, polysulfones, polyether sulfones, polycarbonates, oxymethylene homopolymers, oxymethylene copolymers, polyalkylene sulfides, polyarylene sulfides, polyarylene oxides, polyamides, polyimides, polyethers, poly(esteramide-diisocyanates), polyacrylates, polyesters, cellulosic polymers, polystyrenes, polyurethanes, vinyl polymers, polyhydrazides, polyoxadiazoles, and polytriazoles, which is capable of contributing strength to the composite membrane without significantly impeding the flow of liquids through said composite membrane and an ultrathin semipermeable layer comprising a polybenzimidazole in occluding contact with at least one surface of said microporous polymer support layer.

2. A composite membrane in accordance with claim 1 wherein said semipermeable layer is cast from a polybenzimidazole polymer solution onto said at least one surface of said microporous polymer support layer.

3. A composite membrane in accordance with claim 2 wherein said ultrathin semipermeable layer is cast onto said microporous polymer support layer from a solution of a polybenzimidazole polymer in a solvent which is a nonsolvent for said microporous polymer support layer.

4. A composite membrane in accordance with claim 3 wherein said solvent is selected from the group consisting of N,N-dimethylacetamide, N,N-dimethylforamide, dimethylsulfoxide, methyl-2-pyrrolidone, tetramethylene sulfone, and hexamethylphosphoramide.

5. A composite membrane in accordance with claim 4 wherein said solvent is N,N-dimethylformamide.

6. A composite membrane in accordance with claim 4 wherein said solvent is N,N-dimethylacetamide.

7. A composite membrane in accordance with claim 3 wherein the concentration of said polybenzimidazole polymer in said solution is in the range of from about 5 to about 30 weight percent.

8. A composite membrane in accordance with claim 3 wherein the concentration of said polybenzimidazole polymer in said solution is in the range of from about 8 to about 25 weight percent.

9. A composite membrane in accordance with claim 3 wherein the concentration of said polybenzimidazole polymer in said solution is in the range of from about 12 to about 18 weight percent.

10. A composite membrane in accordance with claim 3 wherein the polybenzimidazole polymer solution contains an additive selected from the group consisting of lithium chloride, organolithium compounds, zinc chloride, N-methylmorpholine, triethylamine and triethanolamine.

11. A composite membrane in accordance with claim 16 wherein said additive is lithium chloride.

12. A composite membrane in accordance with claim 11 wherein the molar ratio of said lithium chloride to said polybenzimidazole polymer in said polymer solution is in the range of from about 0.01:1 to about 3:1.

13. A composite membrane in accordance with claim 12 wherein the Brookfield viscosity of said polybenzimidazole polymer solution is in the range of from about 500 to about 100,000 centipoises when measured at 30° C.

14. A composite membrane in accordance with claim 1 wherein said microporous polymer support layer is hydrophilic or wettable.

15. A composite membrane in accordance with claim 1 wherein said polymer of said microporous polymer support is polypropylene, polysulfone, polyether sulfone, or mixture thereof.

16. A composite membrane in accordance with claim 1 wherein said microporous polymer support layer alone contains pores of average dimensions in the range of from about 50 to about 4000 A, has a thickness of from about 0.5 to about 12 mils and a deionized water flux of at least about 200 gallons/square foot/day at 250 psi pressure.

17. A composite membrane in accordance with claim 1 wherein said semipermeable layer is less than about 1 mil in thickness.

18. A composite membrane in accordance with claim 17 wherein said semipermeable layer is less than about ½ mil in thickness.

19. A composite membrane in accordance with claim 1 wherein said polybenzimidazole polymer comprises recurring units selected from the group consisting of
(I) a unit of the formula

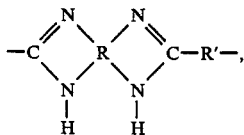

wherein R in (I) is a tetravalent aromatic nucleus, with the nitrogen atoms forming the benzimidazole rings being paired upon adjacent carbon atoms of the aromatic nucleus, and R' is selected from the group consisting of an aromatic ring, an alkylene group, and a heterocyclic ring selected from the group consisting of pyridine, pyrazine, furan, quinoline, thiophene, and pyran;
(II) a unit of the formula

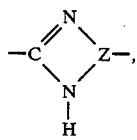

wherein Z is an aromatic nucleus having the nitrogen atoms forming the benzimidazole ring paired upon adjacent carbon atoms of the aromatic nucleus.

20. A composite membrane in accordance with claim 19 wherein said polybenzimidazole polymer consists essentially of recurring units selected from the group consisting of units of Formulas (I) and (II), wherein R' is an aromatic ring or a heterocyclic ring.

21. A composite membrane in accordance with claim 19 wherein said polybenzimidazole polymer is prepared from poly-2,2'-(m-phenylene-5,5'-bibenzimidazole), the recurring unit of which is:

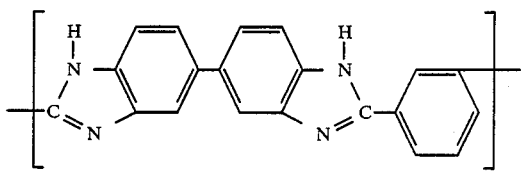

22. A composite membrane in accordance with claim 1 wherein said microporous polymer support layer has the form of a flat film or a hollow filament.

23. A composite membrane in accordance with claim 1, comprising at least one additional porous support layer comprising fibers of materials selected from the group consisting of metals, inorganic compounds, minerals and natural and synthetic polymers, and mixtures of the foregoing.

24. A process for preparing a composite permselective membrane useful for liquid separations comprising a microporous polymer support layer which is capable of contributing strength to the composite membrane without significantly impeding the flow of liquids through said composite membrane and an ultrathin semipermeable layer comprising a polybenzimidazole polymer in occluding contact with at least one surface of said microporous support layer, said process comprising the following steps:
(a) providing a microporous polymer support layer of at least one polymer selected from the group consisting of polyolefins, polysulfones, polyether sulfones, polycarbonates, oxymethylene homopolymers, oxymethylene copolymers, polyalkylene sulfides, polyarylene sulfides, polyarylene oxides, polyamides, polyimides, polyethers, poly(esteramide-diisocyanates), polyacrylates, polyesters, cellulosic polymers, polystyrenes, polyurethanes, vinyl polymers, polyhydrazides, polyoxadiazoles, and polytriazoles, ,having the configuration of a flat film or a hollow filament,
(b) casting a thin film of a polybenzimidazole polymer solution of less than about 3 mils thickness onto said microporous support layer, and
(c) coagulating the cast layer of polybenzimidazole polymer solution by contacting it with a coagulating liquid which is a non-solvent for both said polybenzimidazole polymer and said microporous polymer support layer and which is miscible with the solvent of said polybenzimidazole polymer solution.

25. A process in accordance with claim 24 wherein the solvent in the cast film of said polybenzimidazole polymer is permitted to at least partially evaporated before the membrane is subjected to a coagulating step.

26. A process in accordance with claim 24 wherein said liquid used in the coagulating step is an aqueous solution of an organic liquid.

27. A process in accordance with claim 26 wherein said organic liquid is N,N-dimethylacetamide.

28. A process in accordance with claim 26 wherein said organic liquid is methanol or ethanol.

29. A process in accordance with claim 24 wherein said coagulating liquid is water.

30. A process in accordance with claim 24 wherein the resulting composite membrane is annealed by contacting with an annealing liquid at an elevated temperature.

31. A process in accordance with claim 30 wherein said composite membrane is annealed for a time period in the range of from about ½ minute to about 20 minutes at a temperature in the range of from about 80° C. to 140° C. in a non-deleterious annealing liquid selected from the group consisting of aqueous and nonaqueous solutions of liquid organic compounds which are solvents or non-solvents for the polybenzimidazole polymer, and neat liquid organic compounds which are non-solvents for said polybenzimidazole polymer.

32. A process in accordance with claim 31 wherein said non-solvent for said polybenzimidazole is a polyhydroxy aliphatic alcohol having from two to about six carbon atoms and two or three hydroxy groups.

33. A process in accordance with claim 31 wherein said solvent for said polybenzimidazole polymer is selected from the group consisting of N,N-dimethylacetamide, N,N-dimethylformamide, dimethylsulfoxide, N-methyl-2-pyrrolidone, tetramethylene sulfone, and hexamethylphosphoramide.

34. A process in accordance with claim 31 wherein said annealing liquid is an aqueous solution of a polyhydroxy aliphatic alcohol having from two to about six carbon atoms and two or three hydroxy groups.

35. A composite permselective membrane useful for liquid separations comprising a wettable microporous polymer support layer which is capable of contributing strength to the composite membrane without significantly impeding the flow of liquids through said composite membrane comprising a polymer selected from the group consisting of polyolefins, polysulfones and polyether sulfones, and an ultrathin semipermeable layer cast from a solution of a polybenzimidazole polymer prepared from poly-2,2'-(m-phenylene-5,5'-bibenzimidazole), the recurring unit of which is

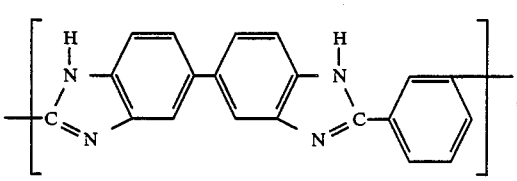

onto at least one surface of said microporous support layer, such that said semipermeable layer is in occluding contact with said microporous support layer, and wherein said semipermeable layer has an average thickness of from about 0.01 to about 0.4 mil and said microporous polymer support layer has an average thickness of from about 1 to about 5 mils.

* * * * *